June 26, 1956
W. J. STRAY
2,751,674
METHODS OF SEALING ELECTRICAL
COMPONENTS IN METAL CASINGS
Filed Jan. 29, 1952
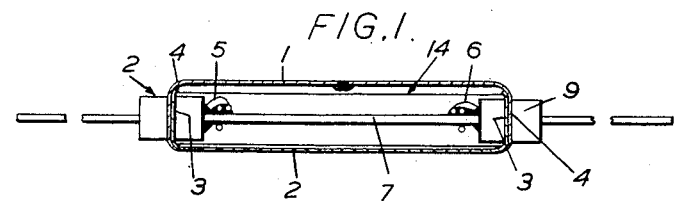
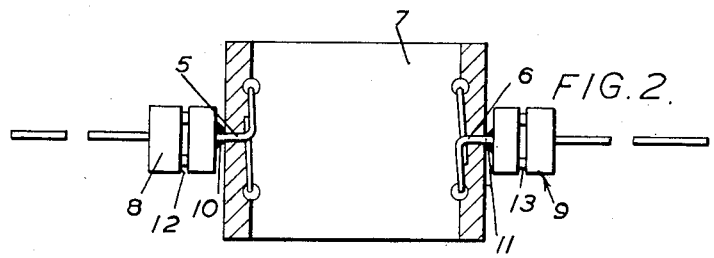
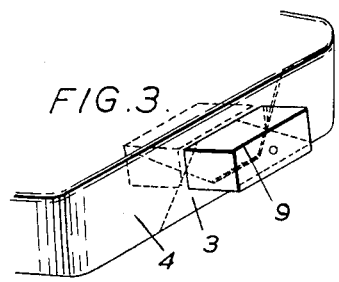
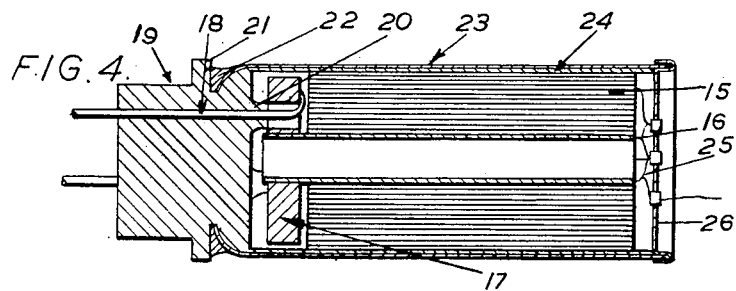
Inventor
W. J. STRAY
By
Attorney

2,751,674

Patented June 26, 1956

---

2,751,674

METHODS OF SEALING ELECTRICAL COMPONENTS IN METAL CASINGS

William John Stray, London, England, assignor to International Standard Electric Corporation, New York, N. Y., a corporation of Delaware Application January 29, 1952, Serial No. 268,825

Claims priority, application Great Britain February 1, 1951

2 Claims. (Cl. 29—463)

This invention relates to a method of sealing electrical components in a metal casing and more particularly to a method of sealing an electrically insulating bushing to a metal case containing an electrical component such as a capacitor, a terminal lead from which passes through the bushing.

Such an electrical bushing is usually hermetically sealed in the wall of the metal case by metallising part of the external surface of the bushing and sealing it to the wall of the case by means of solder, or by providing the bushing with an external metal ring having a flange which is similarly united to the wall of the case by solder.

The object of the present invention is to provide a method of sealing a bushing in the wall of the metal case in such a way that any mechanical strain is not transmitted to the solder so that the latter acts only as a seal. This is of particular importance when the sealed electrical component is subjected to comparatively high temperatures which adversely affect the mechanical strength of the solder. According to the present invention a method of sealing an electrically insulating bushing to a metal case containing an electrical component a terminal lead from which passes through the bush comprise providing a groove on the exterior of said bush, coating said groove with metal and fitting said bush so that the edges of an aperture provided in said metal case fit into said grooves and sealing those edges in the groove by soldering.

By the use of this invention mechanical strain is taken mainly and in some circumstances wholly by mechanical engagement of the edge of the aperture in the case with the groove in the insulating bushing.

Two different embodiments of the invention will now be described with reference to the accompanying drawings in which:

Fig. 1 shows a silvered mica capacitor assembled within a metal case according to British Patent No. 621,903, issued July 27, 1949, with the invention applied thereto.

Fig. 2 shows the sub-unit assembly of Fig. 1 before assembling in the case.

Fig. 3 shows the manner in which each of the insulating bushings shown in Figs. 1 and 2 is gripped by the parts of the metal case.

Fig. 4 shows the invention applied to a tubular casing for a cylindrical capacitor.

Referring to the drawings and first to Figs. 1 to 3 a metal case for an electrical component is constructed as described and claimed in the above mentioned patent. This case comprises a pair of dished parts 1, 2 having upturned rims, the rim 3 on the part 2 being adapted to fit within the rim 4 of the other part 1 so that the two rims overlap and contact one another throughout substantially the whole of the surface of said inner rim to form the enclosed space of said case.

The two rims 3, 4 are provided with slots of truncated V-form as shown in Fig. 3. Terminal leads 5, 6 from an assembled mica capacitor 7 are passed through apertures in ceramic bushings 8, 9 and the leads 5, 6 are sealed in the apertures by means of solder 10, 11 at the ends of the apertures nearest the capacitor 7, as shown in Fig. 2. This constitutes a sub-assembly that can be directly encased within a metal case formed by the two parts 1, 2.

The two ceramic bushings 8, 9 are made rectangular in cross section as shown in Fig. 3 and are provided with grooves 12, 13 shaped to co-operate with the edges of the slots in the rims 3, 4. The interior surfaces of the grooves 12, 13 are metallised and the two metal parts 1, 2 assembled together with the rim 3 of the part 2 within the rim 4 of the part 1 and the edges of the V-shaped slots in the rims engaging in the grooves 12, 13 in the bushings 8, 9. Before the unit is assembled within the casing the capacitor 7 may be wrapped with tissue paper 14.

The edges of the outer rim 4 are then swaged over the part 2. A soldering joint is made between the grooves 12, 13 in the bushings 8, 9 to seal them hermetically to the edges of the slots in the rims 3 and 4 and a soldering joint is also made between the rims thus hermetically sealing the capacitor within the casing.

Referring now to Fig. 4, a multi-unit capacitor 15 is constructed in known manner by rolling interleaved metal foil and paper around a hollow tube 16. The tube 16 protrudes at one end beyond the rolled unit 15 and an insulating plate 17 provided with three apertures is fitted over the tube 16 at that end. Terminals such as 18 connected to the individual capacitors of the unit 15 are threaded through the apertures in plate 17 and through corresponding passages in a cylindrical ceramic bush 19. These terminals 18 are then sealed into the passages in the bush 19 by solder applied on the side of the bush 19 next the plate 17. The bush 19 is formed with projections 20 on its inner face and the inner faces of these projections 20, through which pass the passages accommodating the terminals 18, are metallized e. g. silvered to facilitate sealing of the terminals 18 at the inner ends of these passages.

The cylindrical ceramic bush 19 is formed with a shoulder 21 and a groove 22. The inner surface of the groove 22, including the surface of the shoulder 21 that faces the groove, is metallised, e. g. silvered. A metal tube 23, lined for part of its length with an insulating tube 24, is placed over the assembly until the tube 23 is located against the shoulder 21 on the bush 19. A connecting wire 25 from the end of the unit 15 opposite to that at which the plate 17 is located is threaded through a hole in a dished end cap 26 of metal and this end cap 26 is pushed into the end of the tube 23.

The complete assembly is then mounted in a lathe having a head stock and tail stock adapted to grip the tubular ceramic bush 19 and the inside of the dished rim of the metal end cap 26 respectively. One end of the tube 23 is spun over into the groove 22 in the bush 19 and the edges of the metal end cap 26 are spun over the other end of the tube 23, the operations taking place simultaneously so that all parts of the assembly are mechanically locked together.

The connecting wire 25 is sealed by solder in the hole in the end cap 26, the end of the tube 23 is sealed in the groove 22 by the solder and the metal end cap 26 sealed to the tube 23 in similar manner. The unit may then be vacuum dried, impregnated and filled with oil through a second hole in the end cap 23 and this hole then sealed.

While the principles of the invention have been described above in connection with specific embodiments and particular modifications thereof, it is to be clearly understood that this description is made only by way of example and not as a limitation on the scope of the invention.

What I claim is:

1. A process for sealing an electrical insulating bush, provided with a circumferential groove, to a metal case, the metal case comprising a pair of dish-shaped parts having upturned rims, the rim of each said part being provided with a truncated slot; the process comprising metallizing said groove, placing said bush partially within one of said dish-shaped parts with the edge of the truncated slot thereof fitting in said groove, placing the other dish-shaped part on said one part so that the rim of one fits within the rim of the other, the two rims overlapping and contacting one another, the edge of the other truncated part also fitting in said groove, and sealing said edges in said groove.

2. The process according to claim 1, and further comprising turning the edge of the outer rim over the inner rim.

References Cited in the file of this patent

UNITED STATES PATENTS

| | | |
|---|---|---|
| 2,175,361 | Reger | Oct. 10, 1939 |
| 2,282,106 | Underwood | May 5, 1942 |
| 2,364,071 | Hampton | Dec. 5, 1944 |
| 2,451,125 | Sporing | Oct. 12, 1948 |

FOREIGN PATENTS

| | | |
|---|---|---|
| 584,379 | Great Britain | Jan. 14, 1947 |